(12) United States Patent
De Valon et al.

(10) Patent No.: US 11,500,640 B2
(45) Date of Patent: Nov. 15, 2022

(54) CIRCUITRY TO INDICATE AN EXECUTION MODE TO ACCESS A SECONDARY DEVICE

(71) Applicant: Arm Limited, Cambridge (GB)

(72) Inventors: Hugues Géraud Marie De Valon, Cambridge (GB); Ashutosh Kumar Singh, Cambridge (GB)

(73) Assignee: Arm Limited, Cambridge (GB)

( * ) Notice: Subject to any disclaimer, the term of this patent is extended or adjusted under 35 U.S.C. 154(b) by 697 days.

(21) Appl. No.: 16/355,998

(22) Filed: Mar. 18, 2019

(65) Prior Publication Data
US 2020/0302048 A1     Sep. 24, 2020

(51) Int. Cl.
*G06F 9/38*     (2018.01)
*G06F 9/52*     (2006.01)
*G06F 9/30*     (2018.01)

(52) U.S. Cl.
CPC ........ *G06F 9/3836* (2013.01); *G06F 9/30101* (2013.01); *G06F 9/52* (2013.01)

(58) Field of Classification Search
CPC ....... G06F 9/30101; G06F 9/3836; G06F 9/52
See application file for complete search history.

(56) References Cited

U.S. PATENT DOCUMENTS

| | | | |
|---|---|---|---|
| 5,696,957 A * | 12/1997 | Yamaura | G06F 9/3012 712/202 |
| 2002/0004810 A1* | 1/2002 | Reneris | G06F 9/526 718/104 |
| 2005/0246505 A1* | 11/2005 | McKenney | G06F 12/1036 711/151 |

OTHER PUBLICATIONS

Jeffers et al., "Intel Xeon Phi Processor High Performance Programming", 2016, Chapter 16, pp. 369-382.*

* cited by examiner

*Primary Examiner* — David J. Huisman
(74) *Attorney, Agent, or Firm* — Nixon & Vanderhye P.C.

(57) ABSTRACT

Circuitry comprises processing circuitry to execute program instructions to access a secondary device in an execution mode selected from at least a first execution mode and a second execution mode; and control circuitry to indicate a current execution mode by which the processing circuitry currently accesses the secondary device in response to an access request initiated by the execution by the processing circuitry of program instructions, in which the control circuitry is configured to require the access request to indicate a given execution mode as the current execution mode to be initiated by program instructions executed in the given execution mode.

12 Claims, 7 Drawing Sheets

CIRCUITRY TO INDICATE AN EXECUTION MODE TO ACCESS A SECONDARY DEVICE

BACKGROUND

This disclosure relates to circuitry.

In some data processing circuitry, processing may be performed in one of a plurality of modes, such as a so-called secure and a non-secure mode.

Where a peripheral device needs to be accessed in either mode, it may be inappropriate (for example, to avoid waste of processing resources) to provide a replication of the peripheral device such that there is one instance for each of the execution modes. This implies that there is a need to provide at least some synchronisation to avoid the peripheral device being accessed in more than one mode at once.

SUMMARY

In an example arrangement there is provided circuitry comprising:

processing circuitry to execute program instructions to access a secondary device in an execution mode selected from at least a first execution mode and a second execution mode; and control circuitry to indicate a current execution mode by which the processing circuitry currently accesses the secondary device in response to an access request initiated by the execution by the processing circuitry of program instructions, in which the control circuitry is configured to require the access request to indicate a given execution mode as the current execution mode to be initiated by program instructions executed in the given execution mode.

In another example arrangement there is provided circuitry comprising:

means for executing program instructions to access secondary circuitry means in an execution mode selected from at least a first execution mode and a second execution mode; and control means for indicating a current execution mode by which the means for executing currently accesses the secondary circuitry means in response to an access request initiated by the execution by the means for executing of program instructions, in which the control means is operable to require the access request to indicate a given execution mode as the current execution mode to be initiated by program instructions executed in the given execution mode.

In another example arrangement there is provided a method comprising:

executing program instructions to access a secondary device in an execution mode selected from at least a first execution mode and a second execution mode;

indicating a current execution mode by which the secondary device is accesses in response to an access request initiated by the execution of program instructions, in which the indicating step comprises requiring the access request to indicate a given execution mode as the current execution mode to be initiated by program instructions executed in the given execution mode.

Further respective aspects and features of the disclosure are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1A:
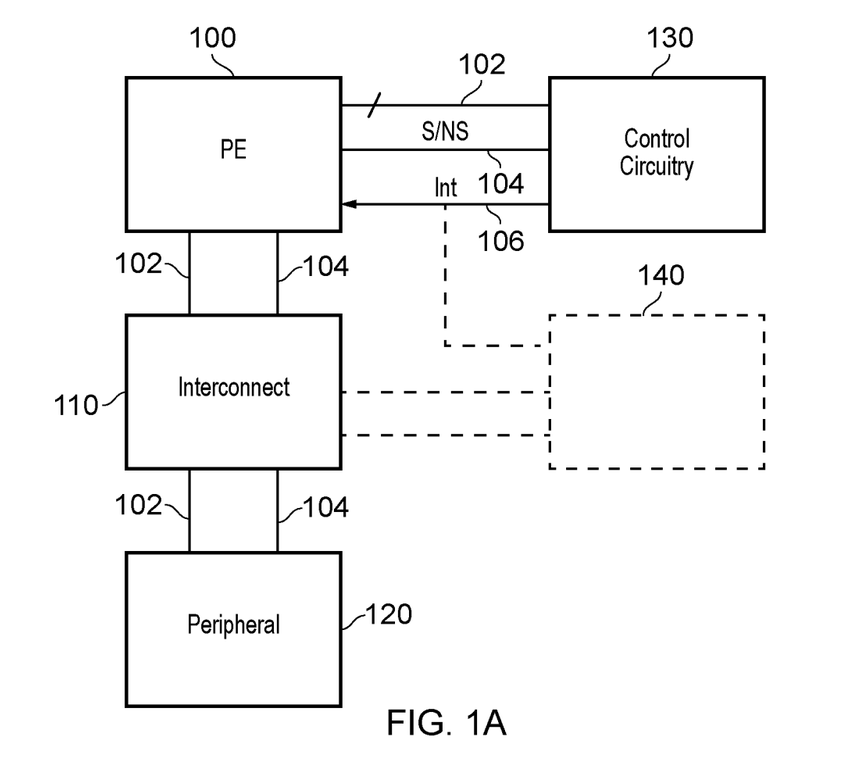
FIG. 1a schematically illustrates circuitry.

FIG. 1a schematically illustrates a circuitry comprising: processing circuitry 100, for example a processing element (PE) or central processing unit (CPU); an optional interconnect circuitry 110; and a peripheral device 120. In operation, the processing circuitry 100 accesses the peripheral device 120, which could be, for example, memory circuitry, secondary processing circuitry such as a co-processor or peripheral device circuitry such as a camera, input device, display device or the like.

FIG. 1a also shows control circuitry 130 connected to and associated with the processing circuitry 100. As shown schematically in FIG. 1b, the control circuitry 130 comprises circuitry implementing a state machine 132 and a configuration data store 134.

Figure 1B:
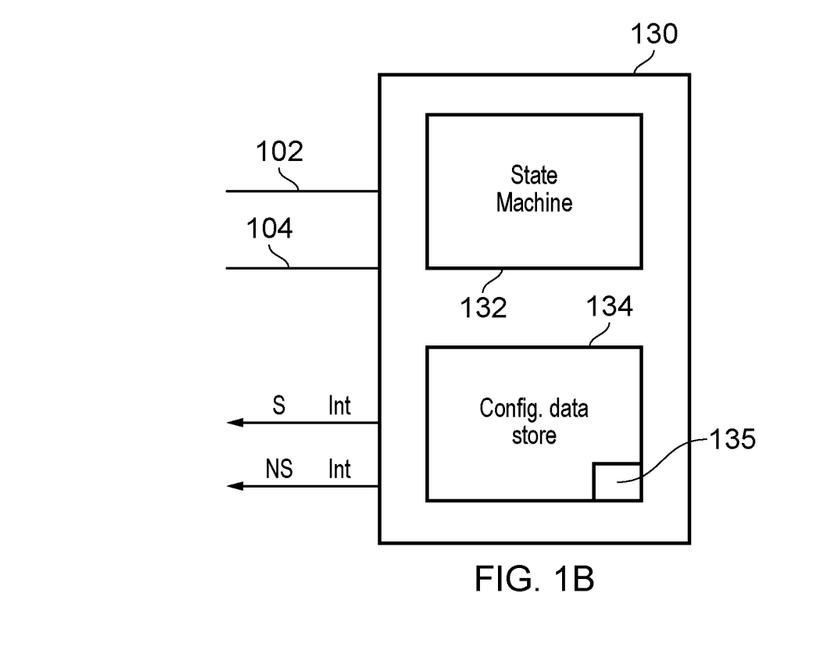
FIG. 1b schematically illustrates control circuitry.

Operations relating to the control circuitry will be discussed in detail below. In general, however, the processing circuitry 100 is configured to execute program instructions to access a secondary device in an execution mode selected from at least a first execution mode and a second execution mode; and the control circuitry 130 is configured to indicate a current execution mode by which the processing circuitry currently accesses the secondary device in response to an access request initiated by the execution by the processing circuitry of program instructions, in which the control circuitry is configured to require the access request to indicate a given execution mode as the current execution mode to be initiated by program instructions executed in the given execution mode.

Note that the control circuitry 130 could instead be connected at a circuit location 140 shown in broken line instead of the circuit location of the control circuitry 130 as drawn. In such an arrangement, interactions between the control circuitry and the processing circuitry would be via the interconnect circuitry 110 and a path (whether via the interconnect circuitry or direct) is provided for communicating interrupts from the control circuitry to the processing circuitry 100.

In the example of FIGS. 1a and 1b, the processing circuitry 100 is configured to execute program instructions to access the peripheral device 120 in an execution mode selected from at least a first execution mode and a second execution mode. In some examples, these modes can have different "security" levels, so that, for example, the first execution mode has a higher security level than the second execution mode. For example, the first execution mode can be referred to as "secure" (S) and the second execution mode as "non-secure" (NS). Here, the references to "secure" and "non-secure" are relative terms and do not imply an absolute lack of security in the NS mode. A general principle is that the system avoids leakage of "secure" data to the "non-secure" domain. For example, program instructions executed in the NS mode can be inhibited from accessing at least some (at least a subset of) processing resources such as memory locations, register contents, some peripheral devices and the like which are associated with (and accessible to) instructions executed in the secure mode.

Communication between the processing circuitry 100 and other components is performed using one or more buses 102, for example multi-bit data and/or address buses, which include (or are associated with) a bus line 104 explicitly indicating whether the current interaction with the processing circuitry 100 is in the S or NS mode. So, the processing circuitry 100 can indicate, as part of an access to the control circuitry 130, whether that access is a secure or non-secure access.

In a theoretically ideal system, the peripheral device 120 might be duplicated so as to provide one instance of the peripheral device 120 for the secure mode and a separate instance of the peripheral device 120 for the non-secure mode. However, in a practical arrangement, this would represent a potentially excessive use of resources such as integrated circuitry die area and/or power consumption, so that in many practical instances, a peripheral device is shared between the secure and non-secure contexts.

In the case of a shared peripheral device, there is a need to synchronise access to the peripheral device. In other words, the peripheral device 120 should not be accessed in the S mode and the NS mode simultaneously. In principle this could be handled by using a so-called mutex or semaphore accessible at the device. However, both the secure and the non-secure state would have to access the same mutex/semaphore which would imply non-trivial operations for the secure and non-secure schedulers to communicate. These operations would be complex to implement and can take a considerable number of clock cycles. If a first state is waiting on a semaphore locked by a second state, when freeing the semaphore the second state would have to notify the first state. To do so, the second state would have to call functions of the first state to modify its scheduling of processes to unblock the blocked process. This would add complexity on the scheduler to achieve that operation. Moreover, when the first state is Secure and the second state is Non-Secure, Non-Secure would have to change its security state to be able to call the Secure scheduler which is also expensive in terms of clock cycles.

Instead, in the present example, the control circuitry 130 can provide an indication of a current execution mode (for example, secure, non-secure) by which the processing circuitry 100 currently accesses the peripheral device 120. The processing circuitry 100 can access the control circuitry to request access to the peripheral device 120 in a particular mode, and once access is granted to the peripheral device 120, the control circuitry retains that setting (in other words, it is "locked" to that mode) until it is released by a further operation of the processing circuitry 100 carried out in the same execution mode.

In more detail, the control circuitry 130 is connected to the bus 102, for example a so-called Advanced Peripheral Bus (APB) (note that the APB may itself include or may be associated with the S/NS indication 104) and can generate interrupt signals 106 in the secure and non-secure domains. The control circuitry 130 provides an indication of a current execution mode by which the processing circuitry accesses the peripheral device 120 and as mentioned above can be "locked" (set to a particular execution mode) by either the secure or non-secure operations. Note that the indication itself (for example respective bits or portions of a register such as STATUS discussed below indicating a current mode to which the control circuitry is "locked") is accessible in a read-only manner by both the S and NS modes, in that (for example) a bit or other portion indicating whether the control circuitry is locked to the S mode is read-only-accessible to the processing circuitry in the S mode, and a bit or other portion indicating whether the control circuitry is locked to the NS mode is read-only-accessible to the processing circuitry in the NS mode. The control circuitry (via a state machine to be discussed below) is capable of setting both portions of the register indicating the current mode.

If instructions in one execution mode attempt to lock the control circuitry while it is already locked by the other execution mode, then in at least some examples the control circuitry will register (but decline) the attempt. It will then trigger an interrupt to the requesting execution mode when it becomes free, or in other words when it ceases to be locked by the other mode. The interrupt will be secure if the secure mode attempted (but failed) to lock the control circuitry and the interrupt will be non-secure if the non-secure mode attempted (but failed) to lock the control circuitry. If, however, there is a request by one execution mode to lock the control circuitry 130 when it is in fact currently unlocked, the control circuitry 130 will be simply locked by the requesting execution mode.

In a similar manner to the respective bits or portions of a register indicating a current mode to which the control circuitry is "locked", requests to lock the control circuitry 130 may be implemented by the processing circuitry 100 writing to respective bits or portions of a request register (such as LOCK REQUEST discussed below) or the like. For example a bit or other portion indicating a request to lock the control circuitry to the S mode is read and write accessible to the processing circuitry in the S mode, and a bit or other portion indicating a request to lock the control circuitry to the NS mode is read and write accessible to the processing circuitry in the NS mode. The control circuitry is capable of reading both portions of the register indicating current requests to lock the control circuitry. This provides an example of the control circuitry being configured to require the access request to indicate a given execution mode as the current execution mode to be initiated by program instructions executed in the given execution mode. This provides an example in which the control circuitry is configured to indicate a current execution mode by which the processing circuitry currently accesses the secondary device by generating status data having a respective portion for each execution mode, the portions being readable only by the processing circuitry executing program instructions executed in the respective execution mode.

Figure 2:
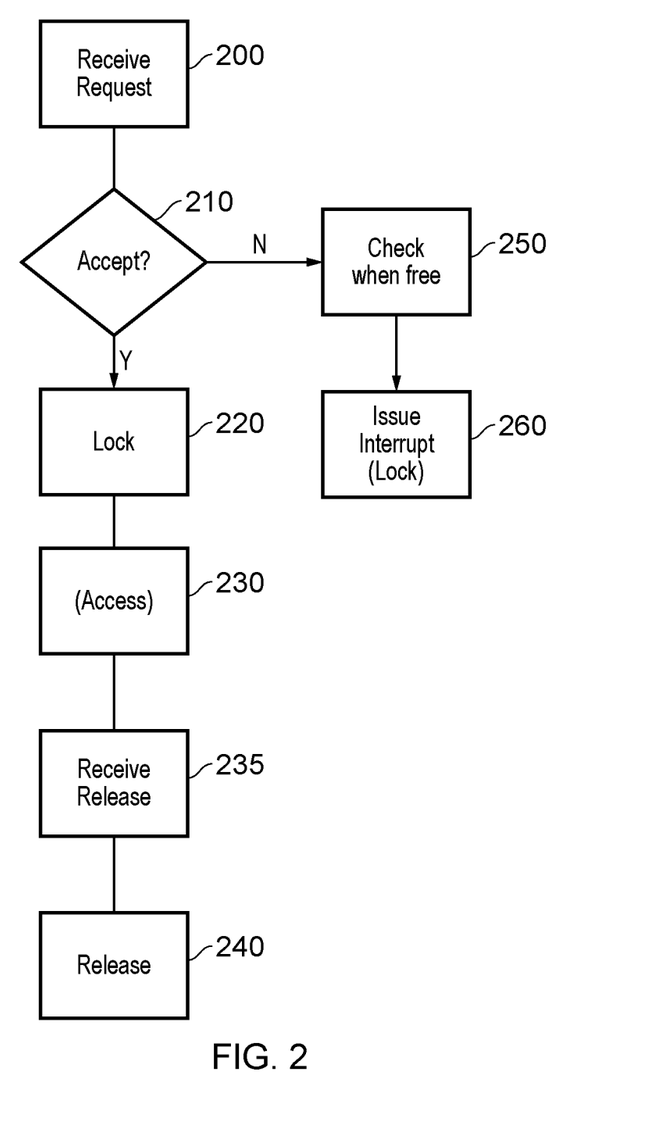
FIG. 2 is a schematic flowchart illustrating a method.

FIG. 2 schematically illustrates some of these aspects of operation of the control circuitry 130 in that a request to lock the control circuitry is received at a step 200, the request being made by the processing circuitry 100 in one of the execution modes.

If that request can be accepted at a step 210 (in that the control circuitry 130 is not currently locked to the other—or another—execution mode) then control passes to a step 220 at which the control circuitry is locked to the requesting execution mode, which can then access (at a step 230) the peripheral device before the control circuitry receives, at a step 235, a request to release the lock of the control circuitry 130 followed by release of the lock at step 240.

On the other hand, if the request cannot be accepted at the step 210, because the control circuitry 130 is in fact locked to the other—or another—execution mode, then, at a step 250, a check is made when the control circuitry 130 becomes free and at a step 260 an interrupt is issued to the requesting execution mode to signify that the previous mode has now released its lock. Optionally the step 260 can also involve locking the control circuitry to the requesting mode, assuming that its request is still in force.

As discussed above with reference to FIG. 1b, the control circuitry comprises a state machine 132 and a configuration data store 134. The control circuitry may be implemented as a so-called IP block within an overall integrated circuit such as a so-called system on chip (SoC) or a network on chip (NoC) device.

In a typical NoC or SoC device, multiple so-called IP blocks are connected to one another to provide a network of such blocks. In this example, an "IP block" is a unit of circuitry with particular functionality, which typically (though not necessarily) represents the intellectual property or IP of a single party. Commonly, in integrated circuit design, these so-called IP blocks are treated as units within the integrated circuit design process, even though an IP block may itself comprise very many gates, transistors or other components in its own right. Note however that the term "IP block" is used here in a generic illustrative sense; an IP block is simply a functional block with the capability of communicating data with other such functional blocks. Similarly, although the term "IP block" implies ownership of rights in the module design, the present disclosure is not limited to any particular ownership arrangement.

The configuration data store may comprise two memory mapped registers: LOCK REQUEST and STATUS.

| Address | Name | Size | Read/Write |
|---|---|---|---|
| 0x0 | LOCK REQUEST | 2 bits (1 bit Secure and 1 bit Non-Secure | Read/write* |
| 0x4 | STATUS | 2 bits (1 bit Secure and 1 bit Non-Secure | Read only* |

(*This refers to access from outside the control circuitry, for example by the processing circuitry 100)

LOCK REQUEST Register

This register has one bit for Secure mode and one bit for the Non-Secure mode. (If more than two modes are used then a bit or state is provided for each of the modes). Each of the bits are writable only by their respective mode so that the write will be ignored otherwise. If the control circuitry 130 is freed while there is currently a lock request, it will generate an interrupt to the requesting side and get directly locked again for that side. Clearing the lock request bit will also clear the interrupt request.

(a) S bit: Set to 1 to request lock of the control circuitry 130 from the Secure side, clear to 0 to free it or stop requesting it. This bit can only be changed by the Secure side.

(b) NS bit: Set to 1 to request lock of the control circuitry 130 from the Non-Secure side, clear to 0 to free it or stop requesting it. This bit can only be changed by the Non-Secure side.

When the control circuitry 130 is freed, the state machine 132 can use this register to check if there is currently a locking request pending. Only one locking request can currently be in force at any time by either side. In at least some examples, this register is not changed by the control circuitry 130 itself.

STATUS Register

This register has one bit for the Secure mode and one bit for the Non-Secure mode. As mentioned before, if more than two modes are in use then one bit or one individual state is provided for each possible mode. Writing (by the processing circuitry 100) is ignored or otherwise inhibited for this register. This register is synchronised by hardware.

(a) S bit: is set to 1 if the lock is currently held by the Secure mode, 0 otherwise.

(b) NS bit: is set to 1 if the lock is currently held by the Non-Secure mode, 0 otherwise.

The control circuitry 130 as presented here is able to be "locked", or in other words to indicate a particular mode having current access to a respective peripheral 120.

Note that a single control circuitry may be configurable to act in connection with a current one of a set of two or more peripheral devices. In this case, the configuration data store 134 can store an indicator 135 of which peripheral device the control circuitry is currently associated with. In example arrangements the indicator 135 can be altered only by the S mode. These arrangements provide an example in which the control circuitry is configured to store configuration data indicating a selected secondary device, of a plurality of secondary devices, for which the control circuitry indicates a current execution mode; and the control circuitry is configured to require a variation of the configuration data (either directly, in the case of LOCK_REQUEST, or indirectly in the case of STATUS) to be initiated by program instructions executed in the first execution mode.

Software Example

The pseudocode example below gives an indication of how a synchronisation mechanism using the control circuitry 130 could be implemented.

Note that text inside the markers /* . . . */ provides a comment rather than an executable step.

In this example, assume that the S and NS modes want to access the same peripheral device 120.

It is assumed that this code is executed with exclusive access over the shared peripheral inside Secure or Non-Secure modes. For example, if multiple threads accessing the same peripheral are running in the same Secure side, synchronisation would have been made to exclusively access the peripheral inside that side. The control circuitry used here is only to synchronise the access of the peripheral across the Secure boundary.

Semaphores are used to make the requesting side wait for the control circuitry to be freed. Semaphores are taken when the control circuitry is already locked and released in the interrupt triggered by the control circuitry when it gets freed.

```
semaphore s_sem = 0 , ns_sem = 0 ;
/* Triggered at step 220 if there was a Secure request when the
control circuitry 130 is unlocked */
   control_circuitry_IRQ_secure ( ) {
   s_sem .V( ) ;
   }
/* Triggered at step 220 if there was a Non-Secure request when the
control circuitry is unlocked */
   control_circuitry_IRQ_non_secure ( ) {
   ns_sem .V( ) ;
   }
   secure function ( ) {
   /* Steps 250, 260: request the control circuitry register secure side for
an interrupt if it is already locked */
   set LOCK_REQUEST_S ( );
   /* Check if the request went through */
   if (S_STATUS( ) == 0) {
   /* If not, wait for the interrupt */
   s_sem .P( ) ;
   /* When execution starts again, the control circuitry has already
automatically been locked for Secure side */
   }
   /* Steps 230-240: exclusively accessing the peripheral */
   access_peripheral ( ) ;
   /* Steps 250-260: free the control circuitry and trigger an interrupt to
```

```
Non-Secure if it requested access while locked to Secure */
    clear LOCK_REQUEST_S ( ) ;
    }
    /* Same f o r the Non-Secure s i d e */
    non_secure_function ( ) {
    set LOCK_REQUEST_NS ( ) ;
    if (NS_STATUS( ) == 0) {
    ns_sem .P( ) ;
    }
    /* Steps 230-240: exclusively accessing the peripheral */
    access_peripheral ( ) ;
    clear LOCK_REQUEST_NS ( ) ;
    }
```

Possible Control Circuitry states

Here is a list of all possible states of the control circuitry with the corresponding value of its registers.

(a) The Control Circuitry is Free

Any side can set its LOCK REQUEST bit to lock it.

| LOCK_REQUEST: S | LOCK_REQUEST: NS | STATUS: S | STATUS: NS |
|---|---|---|---|
| 0 | 0 | 0 | 0 |

(b) The Control Circuitry is Locked by Secure, Non-Secure Did not Request it

| LOCK_REQUEST: S | LOCK_REQUEST: NS | STATUS: S | STATUS: NS |
|---|---|---|---|
| 1 | 0 | 1 | 0 |

There is a symmetric case when the control circuitry is locked by Non-Secure and Secure did not request it.

| LOCK_REQUEST: S | LOCK_REQUEST: NS | STATUS: S | STATUS: NS |
|---|---|---|---|
| 0 | 1 | 0 | 1 |

(c) The Control Circuitry is Locked by Secure, Requested by Non-Secure

| LOCK_REQUEST: S | LOCK_REQUEST: NS | STATUS: S | STATUS: NS |
|---|---|---|---|
| 1 | 1 | 1 | 0 |

When Secure will free the control circuitry by clearing the S bit of LOCK_REQUEST, the Non-Secure interrupt will be triggered. The control circuitry stays locked but the STATUS register will change to reflect its new owner (the new mode to which it is locked). After that, it will become as described in the second table of (b) above:

| LOCK_REQUEST: S | LOCK_REQUEST: NS | STATUS: S | STATUS: NS |
|---|---|---|---|
| 0 | 1 | 0 | 1 |

Figure 3:
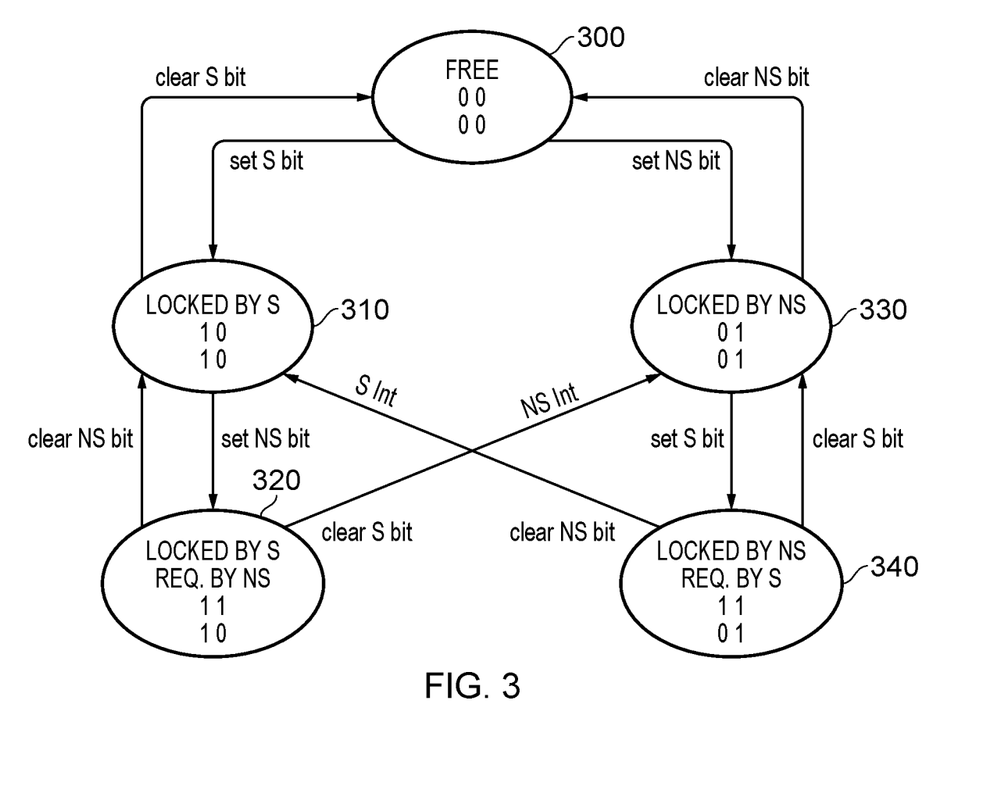
FIG. 3 is a schematic state diagram.

FIG. 3 is a schematic state diagram illustrating some aspects of the operation of the control circuitry 130 of FIG. 1a and FIG. 1b. FIG. 3 represents five states 300, 310, 320, 330, 340, with the states being linked by arrows indicating transitions between the states. Within the representation of each of the states there is provided an example of the lock request bits [S; NS], and underneath, the status bits [S; NS].

The state machine 132 can move between the various states according to the transitions illustrated in FIG. 3, but for the purposes of the present explanation it will be assumed that the state machine 132 is currently starting at the "free" state 300. From the state 300, if the secure mode sets the LOCK_REQUEST_S bit by means of a request to lock the control circuitry 130 to the secure side, then the state transitions to the state 310, locked by S. The state can return to the free state 300 by the processing circuitry 100 clearing the LOCK_REQUEST_S bit (by the execution of an appropriate instruction in the secure mode). Similarly, if the NS mode sets the LOCK_REQUEST_NS bit, starting from the free state 300, then the state machine 132 transitions to the state 330, locked by NS, from which is can return by the processing circuitry in the NS mode clearing the LOCK_REQUEST_NS bit. When the control circuitry 130 is already locked by either mode (in the states 310 or 330), the other mode can attempt to lock the control circuitry 130. For example, from the state 310, the NS mode can set the LOCK_REQUEST_NS bit, transitioning the system to the state 320 (locked by S requested by NS). From here, if the LOCK_REQUEST_NS bit is cleared, the state machine returns to the state 310. However, if the LOCK_REQUEST_S bit is cleared (so that the secure mode releases the control circuitry) then the system transitions directly to the state 330 (locked by NS) and provides an interrupt in the NS mode to the processing circuitry 100. Similarly, starting from the state 330, setting the LOCK_REQUEST_S bit transitions to the state 340 (locked by NS but requested by S). Clearing the LOCK_REQUEST_S bit returns to the state 330 but clearing the LOCK_REQUEST_NS bit passes control to the state 310 and a secure interrupt is provided to the processing circuitry 100 to indicate this transition. The issue of the interrupt in either mode provides an example in which the control circuitry is configured, in response to release of the indication of the current execution mode, to provide an availability indication for an execution mode for which an access request was received while the control circuitry indicated a different execution mode as the current execution mode. Such a processing circuitry interrupt is provided in the execution mode for which the access request was received.

The transitions back to the state 300 from either of the states 310, 330 represent examples in which the control circuitry is configured to release an indication of the current execution mode in response to a release request initiated by the execution by the processing circuitry of program instructions in the indicated current execution mode.

The transitions from 340 to 310, or from 320 to 330, provide an example in which the control circuitry is configured, in response to release of the indication of the current execution mode, to indicate, as a new current execution mode, an execution mode for which an access request was received before the release of the indication of the current execution mode.

In each state, the processing circuitry can detect which mode is currently locked by reading the STATUS_S and/or STATUS_NS bits as appropriate.

Further improvements are described below with reference to FIG. 4, which address the feature of the circuitry described so far that the control circuitry 130 provides just an indication of which execution mode is currently able to access the peripheral device 120 and so relies on trust that the "wrong" execution mode, which is to say the mode to which the peripheral is not currently indicated to be locked, (for example, by malicious code running on the processing circuitry 100) will not access the peripheral device 120 when it is not permitted to do so.

Similarly, the control circuitry 130 relies upon each mode relinquishing control or locking of the control circuitry 130 at the appropriate time, and once again, in principle it may be possible for malicious code to maintain the locked state inappropriately and indefinitely.

Figure 4A:
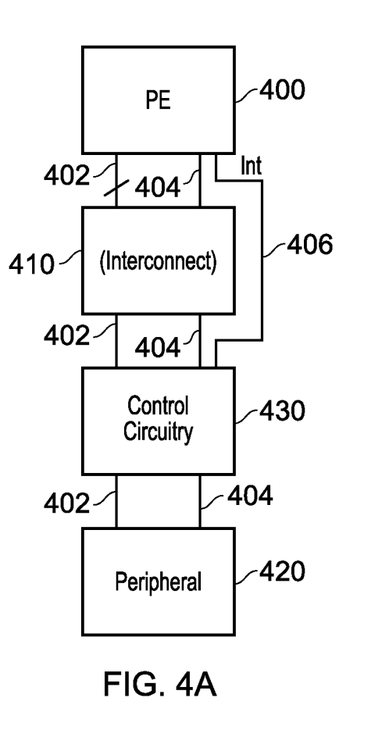
FIG. 4a schematically illustrates another example of circuitry.

Referring to FIG. 4*a*, the processing circuitry 400 accesses the peripheral device 420 via the control circuitry 430 (optionally being connected via an interconnect 410). This allows the control circuitry 430 not only to indicate access permissions but also to gate access to the peripheral device 420. Once again, communication is provided by a bus 402, for example an APB bus accompanied by or including a secure/non-secure indication 404, and the control circuitry 430 can provide secure and non-secure interrupts 406 to the processing circuitry 400.

Figure 4B:
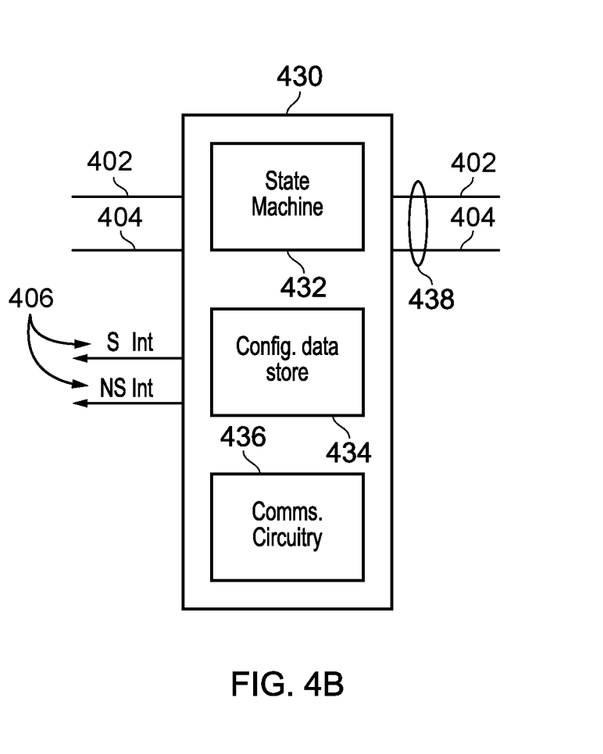
FIG. 4b schematically illustrates another example of control circuitry.

Referring to FIG. 4*b*, the control circuitry 430 comprises a state machine 432, a configuration data store 434 and communications circuitry 436 which serves to communicate signals received on the bus 404 to/from the peripheral device 420 via an APB bus 438.

The communications circuitry 436 provides an example of access circuitry to inhibit access to the secondary device by program instructions executed in an execution mode other than the indicated current execution mode.

Figure 5:
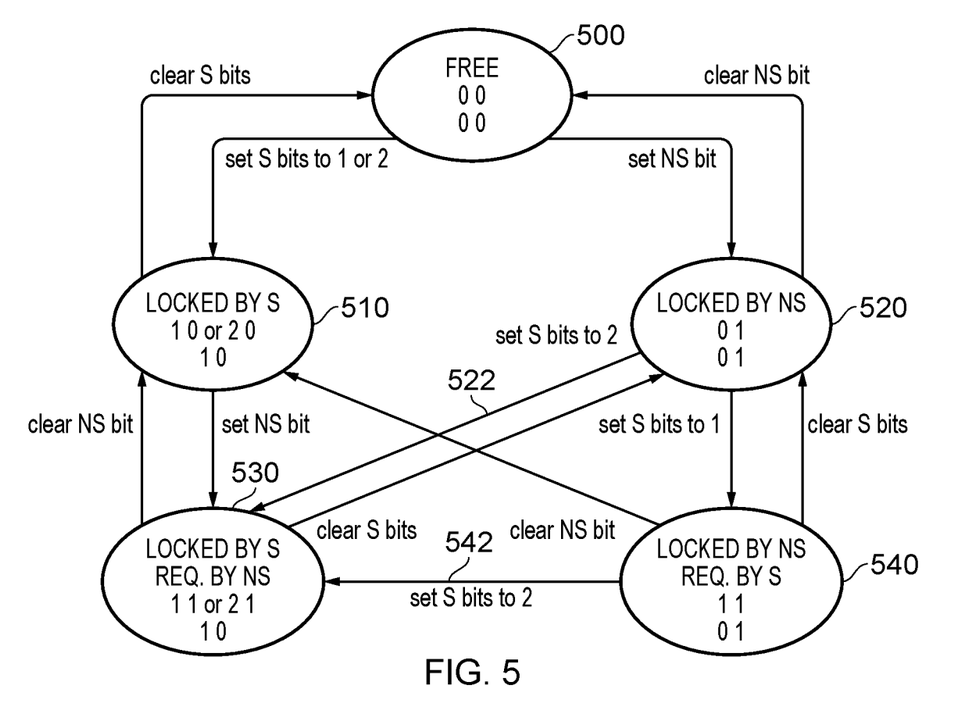
FIG. 5 is a schematic state diagram.

FIG. 5 is a schematic representation of a state diagram for the state machine 432 of FIG. 4*b*. In many respects this is similar to the states diagram described above in FIG. 3, in that it has five states: a state 500 (free: not locked by either S or NS); a state 510 (locked by S); a state 520 (locked by NS); a state 530 (locked by S but requested by NS); and a state 540 (locked by NS but requested by S). As before, the lock request bits [S; NS] are shown schematically above the status bits [S; NS] in each of the schematic states of FIG. 5.

A significant difference over the state diagram of FIG. 3 is that the lock_request bits for the secure mode can be set to three potential values, shown schematically in FIG. 5 as 0, 1 or 2. Setting the secure lock request bit to a value of 1 causes behaviour similar to that shown (for a LOCK_REQUEST_S value of 1) in FIG. 3, in that if the current state is "free" (500) then the control circuitry will be locked to the secure mode (510) as before and, in the case of the control circuitry already being locked to the non-secure mode (520), setting the secure mode lock_request bit to 1 will transition to the state 540.

However, setting the lock request bit for the secure mode LOCK_REQUEST_S to the other value (for example, 2) allows the secure mode to force ownership of the peripheral device even if it is currently locked to the non-secure mode and prevents the non-secure mode from retaining current control of the peripheral device. The transitions relevant to this feature include a transition 542 from the state 540 to the state 530 which is initiated by the secure mode setting LOCK_REQUEST_S to 2, so over-riding the current locking by the non-secure mode and transitioning to a state where the control circuitry is now locked by the secure mode but requested by the non-secure mode. Similarly, a transition 522 from the state 520 to the state 530 is initiated by the secure mode setting LOCK_REQUEST_S to the value 2. So, in either of the states representing locking by the non-secure mode (520, 540) the current state can be over-ridden by the secure mode setting its lock request bits to 2, transitioning in each instance to the state 530 so that clearing the secure mode lock request bits allows a transition back to the state 520.

The setting of the bits to 2 provides an example in which in which the first execution mode (S) has a higher security level than the second execution mode (NS) such that program instructions executed in the second execution mode are inhibited from access processing resources associated with execution in the first execution mode, and in which the control circuitry is configured to release an indication of the second execution mode as the current execution mode in response to an override request (set to 2) initiated by the execution by the processing circuitry of program instructions in the first execution mode.

Note that in the case of one of the LOCK_REQUEST bits (S or NS) being set to 1 in either FIG. 3 or FIG. 5 as an example of the processing circuitry issuing an access request, the processing circuitry can cancel that access request (effectively issuing a cancellation request) by subsequently setting that LOCK_REQUEST bit to 0 again. This cancellation could take place before access has been granted by the control circuitry and is indicated by the path "clear S bits" and "clear NS bits" in each state diagram.

Therefore an access request of the type described above provides an example of a persistent access request in a given execution mode to request the control circuitry to indicate access in the given execution mode, the control circuitry being configured to retain the persistent access request until a cancellation request in the given execution mode is received by the control circuitry or access is granted to the given execution mode. This can be cancelled by a cancellation request in the given execution mode to cancel a persistent access request in the given execution mode.

Note also that the control circuitry could itself cancel the LOCK_REQUEST bit (S or NS) if it is unable to provide locking straight away, or within a predetermined time such as one second. This provides an example of the use of a transient access request in the given execution mode to request to request the control circuitry to indicate access in the given execution mode, the control circuitry being configured to cancel the transient access request when the control circuitry currently indicates another execution mode.

Figure 6:
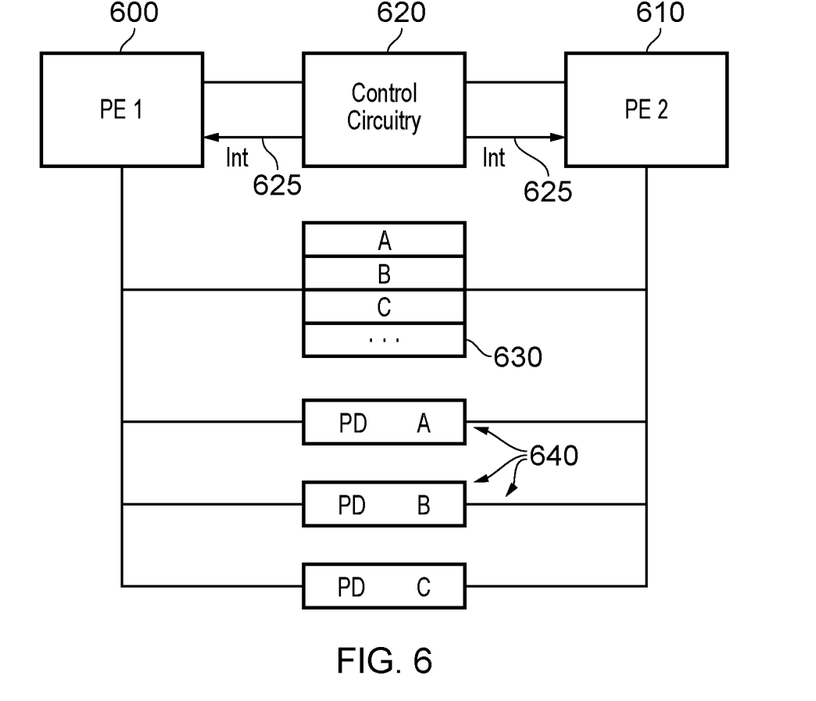
FIG. 6 schematically illustrates another example of circuitry.

FIG. 6 shows an alternative arrangement using the techniques described above.

In the examples given above, the processing circuitry is operable in different security modes, for example a secure mode or a non-secure mode. In the example of FIG. 6, the processing circuitry comprises multiple processing elements 600, 610 so that, collectively, the processing elements, 600, 610 are operable in a first mode in which the processing element 600 has control of a peripheral device and a second mode in which the processing element 610 has control of the peripheral device. As before, there could be more than two modes, for example if more than two processing elements are provided.

Although control circuitry of the form shown above could be used, so that there is a one-to-one mapping of control circuitry to peripheral devices, another possible arrangement is shown schematically in FIG. 6, in which control circuitry 620 indicates and/or controls current access by the processing elements 600, 610 to a memory space or a set of registers 630, providing one register for each of a set of peripheral devices 640, labelled as PD A, PD B, PD C . . . in FIG. 6. An example technique for operating the apparatus of FIG. 6 is shown schematically in a flow chart of FIG. 7.

Figure 7:
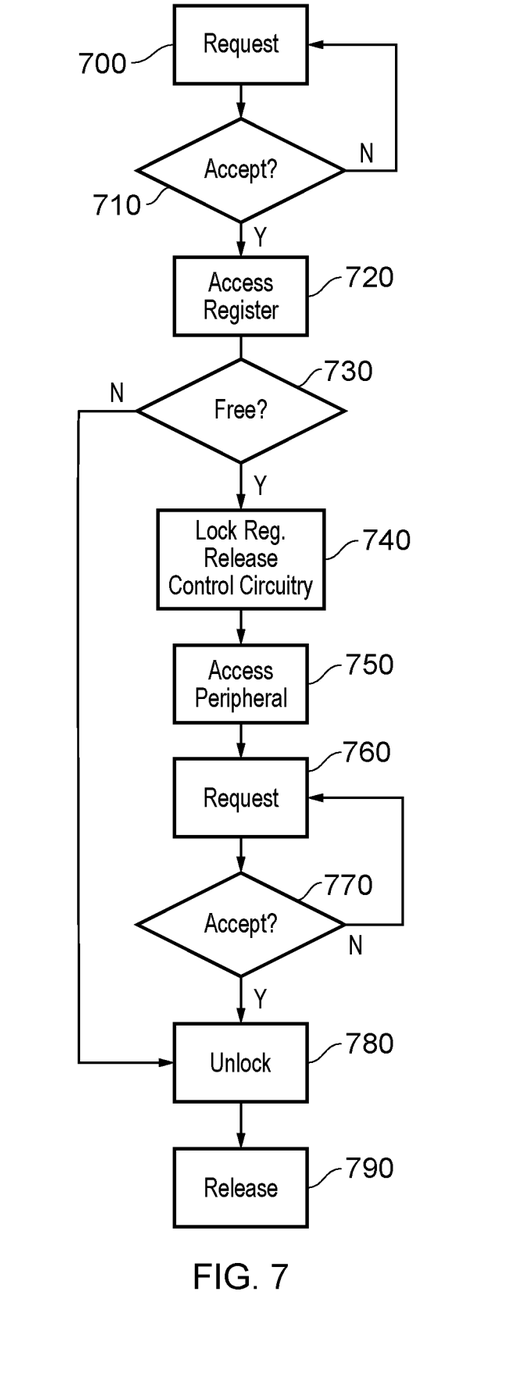
FIGS. 7 and 8 are schematic flowcharts illustrating respective methods.

Referring to FIG. 7, at a step 700, one of the processing elements 600, 610 (or others—as discussed above there could be more than two) makes a request to the control circuitry 620 for access to the memory or registers 630. If this request is not accepted at a step 710 then control returns to the step 700 such that the requesting processing element either tries again or waits for an interrupt 625 indicating that the control circuitry 620 is now free.

If the request is accepted then the requesting processing element has current access to the memory or registers 630 and accesses them at a step 720. In this access, the requesting processing element can check whether the register or memory entry for a particular peripheral device (for example, an entry A for the peripheral device PD A) indicates that the peripheral device is currently free. The processing element detects this at a step 730 and, if the peripheral device is free, write data to the memory or register entry for that peripheral device at a step 740 to lock the peripheral device. Note that at this point, the action of the control circuitry 620 means that the other processing element (s) cannot simultaneously attempt to lock that peripheral device by writing to that same memory entry. Also at the step 740, the requesting processing element can (after writing to the relevant register) release its lock of the registers 630 by releasing the control circuitry 620.

So, the single control circuitry 620 provides locked access to the set of registers 630 which in turn lock access to the peripheral devices. This can reduce the circuitry requirements (compared to providing one control circuitry 620 for each peripheral device). Note that the control circuitry of either of the embodiments discussed above can be used, in that in some examples the control circuitry 620 could actively gate access to the registers 630.

At a step 750, the requesting processing element accesses the relevant peripheral device and, at the end of that access, requests exclusive access at the control circuitry 620 to the memory or register 630 at a step 760. If this is accepted at a step 770 then the requesting processing element writes data to the relevant memory or register entry at a step 780 to unlock access to that peripheral device and at a step 790 releases the control of the control circuitry 620.

Note that in the example above, the requesting processing element releases the locked access to the registers 630 while it is actually accessing the peripheral device, and re-acquires locking of the control circuitry 620 at the step 760 to unlock the register for the selected peripheral device. However, it is not a requirement that the processing element releases and reacquires locking of the control circuitry 620; in other examples it could retain lock of the control circuitry for the duration of its access to the selected peripheral device.

Figure 8:
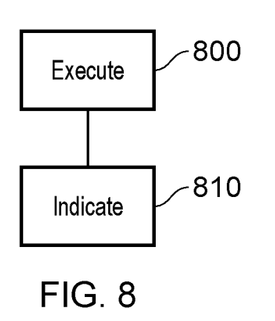

FIG. 8 provides a summary schematic flowchart showing a method comprising: executing (at a step 800) program instructions to access a secondary device in an execution mode selected from at least a first execution mode and a second execution mode;

indicating (at a step 810) a current execution mode by which the secondary device is accesses in response to an access request initiated by the execution of program instructions, in which the indicating step comprises requiring the access request to indicate a given execution mode as the current execution mode to be initiated by program instructions executed in the given execution mode.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Circuitry comprising:
    processing circuitry to execute program instructions to access a secondary device in an execution mode selected from at least a first execution mode and a second execution mode; and
    control circuitry, separate from the processing circuitry and from the secondary device, to indicate a current execution mode by which the processing circuitry currently accesses the secondary device in response to an access request initiated by the execution by the processing circuitry of program instructions, wherein:
    the control circuitry is configured to require the access request to indicate a given execution mode as the current execution mode to be initiated by program instructions executed in the given execution mode,
    the control circuitry is configured to store configuration data indicating a selected secondary device of a plurality of secondary devices, for which the control circuitry indicates the current execution mode,
    the control circuitry is configured to release an indication of the current execution mode in response to a release request initiated by the execution by the processing circuitry of program instructions in the indicated current execution mode,
    the first execution mode has a higher security level than the second execution mode such that program instructions executed in the second execution mode are inhibited from accessing processing resources associated with execution in the first execution mode, and
    the control circuitry is configured to release an indication of the second execution mode as the current execution mode in response to an override request initiated by the execution by the processing circuitry of program instructions in the first execution mode.

2. Circuitry according to claim 1, wherein:
    the control circuitry is configured to require a variation of the configuration data to be initiated by program instructions executed in the first execution mode.

3. Circuitry according to claim 1, wherein the control circuitry is configured, in response to release of the indication of the current execution mode, to provide an availability indication for an execution mode for which an access request was received while the control circuitry indicated a different execution mode as the current execution mode.

4. Circuitry according to claim 3, wherein the availability indication comprises a processing circuitry interrupt.

5. Circuitry according to claim 4, wherein the processing circuitry interrupt comprises a processing circuitry interrupt in the execution mode for which the access request was received.

6. Circuitry according to claim 3, wherein the processing circuitry is configured to generate one or more selected from the list consisting of:
- a persistent access request in the given execution mode to request the control circuitry to indicate access in the given execution mode, the control circuitry being configured to retain the persistent access request until a cancellation request in the given execution mode is received by the control circuitry or access is granted to the given execution mode;
- a cancellation request in the given execution mode to cancel a persistent access request in the given execution mode; and
- a transient access request in the given execution mode to request the control circuitry to indicate access in the given execution mode, the control circuitry being configured to cancel the transient access request when the control circuitry currently indicates another execution mode.

7. Circuitry according to claim 1, wherein the control circuitry is configured, in response to release of the indication of the current execution mode, to indicate, as a new current execution mode, an execution mode for which an access request was received before the release of the indication of the current execution mode.

8. Circuitry according to claim 1, wherein the control circuitry comprises access circuitry to inhibit access to the secondary device by program instructions executed in an execution mode other than the indicated current execution mode.

9. Circuitry according to claim 1, wherein the control circuitry is configured to indicate a current execution mode by which the processing circuitry currently accesses the secondary device by generating status data having a respective portion for each execution mode, the portions being readable only by the processing circuitry executing program instructions executed in the respective execution mode.

10. Circuitry according to claim 1, wherein the secondary device is selected from the list consisting of:
- memory circuitry;
- secondary processing circuitry; and
- peripheral device circuitry.

11. Circuitry comprising:
- means for executing program instructions to access secondary circuitry means in an execution mode selected from at least a first execution mode and a second execution mode; and
- control means, separate from the means for executing and from the secondary circuitry means, for indicating a current execution mode by which the means for executing currently accesses the secondary circuitry means in response to an access request initiated by the execution by the means for executing of program instructions, wherein:
- the control means is operable to require the access request to indicate a given execution mode as the current execution mode to be initiated by program instructions executed in the given execution mode,
- the control means is operable to store configuration data indicating a selected secondary device of a plurality of secondary devices, for which the control means indicates the current execution mode,
- the control means is operable to release an indication of the current execution mode in response to a release request initiated by the execution by the means for executing of program instructions in the indicated current execution mode,
- the first execution mode has a higher security level than the second execution mode such that program instructions executed in the second execution mode are inhibited from accessing processing resources associated with execution in the first execution mode, and
- the control means is operable to release an indication of the second execution mode as the current execution mode in response to an override request initiated by the execution by the means for executing of program instructions in the first execution mode.

12. A method comprising:
- executing program instructions in processing circuitry to access a secondary device in an execution mode selected from at least a first execution mode and a second execution mode;
- indicating in control circuitry, separate from the processing circuitry and from the secondary device, a current execution mode by which the secondary device is accessed in response to an access request initiated by the execution of program instructions, wherein the indicating step comprises requiring the access request to indicate a given execution mode as the current execution mode to be initiated by program instructions executed in the given execution mode;
- storing configuration data indicating a selected secondary device of a plurality of secondary devices, for which the current execution mode is indicated;
- releasing an indication of the current execution mode in response to a release request initiated by the execution by the processing circuitry of program instructions in the indicated current execution mode,
- wherein the first execution mode has a higher security level than the second execution mode such that program instructions executed in the second execution mode are inhibited from accessing processing resources associated with execution in the first execution mode, and
- releasing an indication of the second execution mode as the current execution mode in response to an override request initiated by the execution by the processing circuitry of program instructions in the first execution mode.

* * * * *